United States Patent
Brummund et al.

(10) Patent No.: US 12,301,146 B2
(45) Date of Patent: May 13, 2025

(54) PRODUCING A MOTOR VOLTAGE FOR A SWITCH DRIVE

(71) Applicant: Siemens Energy Global GmbH & Co. KG, Munich (DE)

(72) Inventors: David Brummund, Halle / Saale (DE); Thomas Hilker, Stahnsdorf (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 408 days.

(21) Appl. No.: 17/637,152

(22) PCT Filed: Jul. 22, 2020

(86) PCT No.: PCT/EP2020/070611
§ 371 (c)(1),
(2) Date: Feb. 22, 2022

(87) PCT Pub. No.: WO2021/032391
PCT Pub. Date: Feb. 25, 2021

(65) Prior Publication Data
US 2022/0311371 A1    Sep. 29, 2022

(30) Foreign Application Priority Data
Aug. 21, 2019   (DE) ............. 10 2019 212 519.0

(51) Int. Cl.
*H02P 27/08* (2006.01)
*H01H 3/26* (2006.01)
*H02M 3/156* (2006.01)

(52) U.S. Cl.
CPC ............ *H02P 27/08* (2013.01); *H01H 3/26* (2013.01); *H02M 3/156* (2013.01); *H01H 2003/266* (2013.01)

(58) Field of Classification Search
CPC .......... H02P 27/00; H02P 27/04; H02P 27/06; H02P 27/08; H02P 27/085; H02P 27/14;
(Continued)

(56) References Cited

U.S. PATENT DOCUMENTS 5,459,631 A    10/1995   Leone et al.
6,313,602 B1   11/2001   Arefeen et al.
(Continued)

FOREIGN PATENT DOCUMENTS

AT    400273 B     11/1995
DE    69220127 T2   1/1998
(Continued)

OTHER PUBLICATIONS

English translation of KR101969019. (Year: 2019).*

*Primary Examiner* — Thienvu V Tran
*Assistant Examiner* — Carlos O Rivera-Perez
(74) *Attorney, Agent, or Firm* — Laurence A. Greenberg; Werner H. Stemer; Ralph E. Locher

(57) ABSTRACT

A method for producing a voltage for an electric motor of a drive of an electrical switch includes producing a DC link direct voltage from a supply voltage and producing the motor voltage by pulse-width modulation of the direct voltage. A tolerance range for changing the direct voltage is specified, and an actual value of the direct voltage is continually measured. After first measuring the actual value, it is stored in a voltage variable. After each additional measurement, it is checked whether the deviation of the actual from the stored value lies within the tolerance range. The actual value is stored if the deviation from the stored value lies outside of the tolerance range. After each storage, a duty cycle of the pulse-width modulation dependent on the
(Continued)

actual value is calculated, and the pulse-width modulation occurs with the duty cycle. A power converter is also provided.

15 Claims, 2 Drawing Sheets

(58) Field of Classification Search
CPC .. H01H 3/00; H01H 3/22; H01H 3/26; H01H 3/30; H01H 2003/225; H01H 2003/266; H01H 3/3005; H02M 3/156; H02M 3/1566; H02M 3/157; H02M 3/158; H02M 3/1588; H02M 1/00; H02M 1/0003; H02M 1/0012; H02M 1/0016; H02M 1/0022; H02M 1/0025; H02M 5/00; H02M 5/40; H02M 5/42; H02M 5/45; H02M 5/4505; H02M 5/451; H02M 5/452; H02M 5/453; H02M 5/458; H02M 5/4585; H02M 7/00; H02M 7/42; H02M 7/44; H02M 7/48; H02M 7/515; H02M 7/525; H02M 7/527; H02M 7/529; H02M 7/53873; H02M 7/5395

USPC ............... 323/266, 271–276, 282–285, 288, 323/299–303, 351; 363/15–17, 34, 35, 363/37, 40–48, 74, 95–99, 123–127, 363/131–134; 361/78, 79, 86, 88–92, 361/114, 115, 152, 154, 155, 156, 160, 361/170

See application file for complete search history.

(56) References Cited

U.S. PATENT DOCUMENTS

| | | |
|---|---|---|
| 9,450,492 B1 | 9/2016 | Bizjak et al. |
| 2019/0237274 A1 | 8/2019 | Hilker |

FOREIGN PATENT DOCUMENTS

| | | | |
|---|---|---|---|
| DE | 102007055673 B3 | 2/2009 | |
| EP | 3309952 A1 | 4/2018 | |
| KR | 101969019 B1 | 8/2019 | |
| WO | WO-2018054672 A1 * | 3/2018 | ............... H01H 3/26 |

* cited by examiner

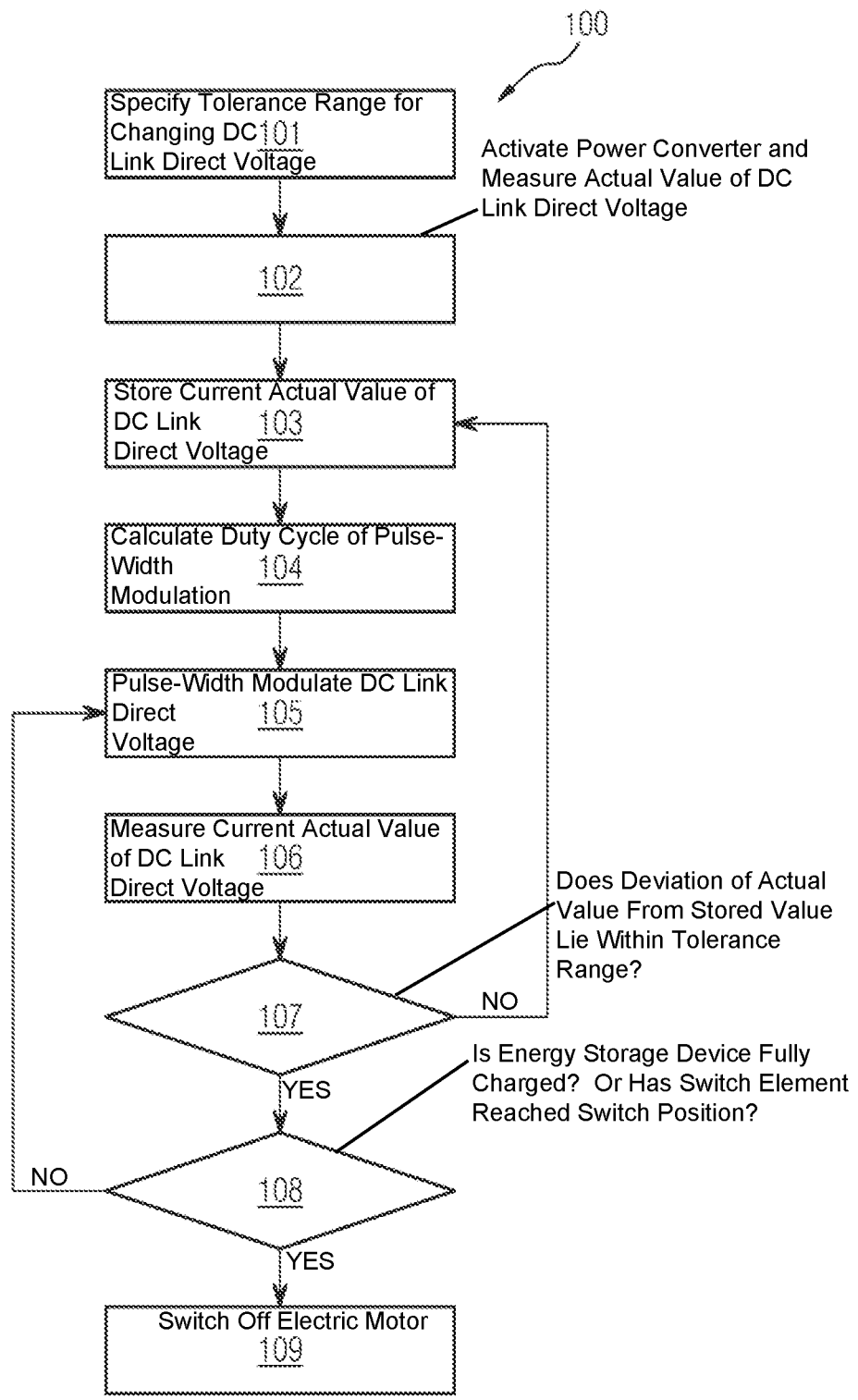

PRODUCING A MOTOR VOLTAGE FOR A SWITCH DRIVE

FIELD AND BACKGROUND OF THE INVENTION

The invention relates to a method and to a power converter for producing a motor voltage for an electric motor of a switch drive of an electrical switch.

Electrical switches such as power switches or circuit breakers normally have at least one movable switch element for interrupting and closing a current path. In order to move the switch element, mechanical energy is required which is often provided by an electric motor which drives the switch element directly or via a gearbox or charges an energy storage device. A spring accumulator with a spring which can be tensioned by the electric motor is used as an energy storage device, for example. As a result of normative specifications and customer requirements, the electrical supply voltages which are available to the electric motors are very varied and, in addition to the voltage level, also differ in the voltage form (direct voltage, single-phase or multiphase alternating voltage). In order to be able to operate an electric motor at different supply voltages, a power converter is used, for example, with which a motor voltage for the electric motor can be produced from the respective supply voltage. A power converter of this type firstly converts a supply voltage into a DC link direct voltage, for example, and produces the motor voltage by pulse-width modulation of the DC link direct voltage.

SUMMARY OF THE INVENTION

The underlying object of the invention is to specify an improved method and an improved power converter for producing a motor voltage for an electric motor of a switch drive of an electrical switch, in order to be able to produce the motor voltage in a flexible manner from different and changing supply voltages.

The object is achieved according to the invention by a method with the features described below, a power converter with the features described below, an electrical switch with the features described below and a computer program with the features described below.

Advantageous configurations of the invention are the subject matter of the subclaims.

In the method according to the invention for producing a motor voltage for an electric motor of a switch drive of an electrical switch, a DC link direct voltage is produced from a supply voltage and the motor voltage is produced by pulse-width modulation of the DC link direct voltage. In this case, a tolerance range for a change in the DC link direct voltage is specified and an actual value of the DC link direct voltage is continually measured. After the first measurement of the actual value, the actual value is stored in a voltage variable. After each additional measurement of the actual value, it is checked whether a deviation of the actual value from the value stored in the voltage variable lies within the tolerance range, and the actual value is stored in the voltage variable if the deviation of the actual value from the value stored in the voltage variable lies outside of the tolerance range. After each storage of an actual value in the voltage variable, a duty cycle, which is dependent on this actual value, of the pulse-width modulation is calculated and the pulse-width modulation is carried out with this duty cycle.

In the method according to the invention, the motor voltage is therefore produced by pulse-width modulation of a DC link direct voltage which is produced from a supply voltage. In this case, the duty cycle of the pulse-width modulation is adapted to the respective supply voltage, in order to be able to produce the motor voltage from different and changing supply voltages. However, a recalculation of the duty cycle requires relatively high computing power. The invention therefore makes provision for the duty cycle to only be recalculated in the case of a substantial change in the DC link direct voltage. For this purpose, a tolerance range for the change in the DC link direct voltage is specified and a voltage variable is used in which a measured value of the DC link direct voltage is stored. The duty cycle is only recalculated if a deviation of a current actual value of the DC link direct voltage from the value stored in the voltage variable lies outside of the tolerance range. With each recalculation of the duty cycle, the value of the voltage variable is further updated to the current actual value of the DC link direct voltage. As a result, recalculations of the duty cycle are only avoided in the case of minor changes in the supply voltage and this advantageously saves time and computing power for recalculations of the duty cycle.

The tolerance range can be specified symmetrically or asymmetrically around the value stored in the voltage variable. Furthermore, the limits of the tolerance range can be specified by absolute values or relative values of the deviation of the actual value from the value stored in the voltage variable.

In one configuration of the invention, a calculation number of calculations of the duty cycle is detected. In other words, the (re)calculations of the duty cycle are counted. This makes it possible to advantageously analyze whether the tolerance range is reasonably selected, and the tolerance range can be adapted if necessary. Furthermore, instabilities of a supply voltage and/or of the switch drive which result in frequent strong fluctuations in the DC link direct voltage can be identified.

Provision can be made, for example, for a threshold value for the calculation number to be specified, for the calculation number to be compared with the threshold value and for a warning signal to be produced if the calculation number reaches or exceeds the threshold value. Additionally or alternatively, provision can be made for the calculation number to be displayed on a display unit.

A power converter according to the invention for producing a motor voltage for an electric motor of a drive of an electrical switch comprises two power converter units, a measuring unit and a control unit. A first power converter unit is set up to produce a DC link direct voltage from a supply voltage. The measuring unit is set up to continually measure an actual value of the DC link direct voltage. The second power converter unit is set up to produce the motor voltage by pulse-width modulation of the DC link direct voltage. The control unit is set up to store a specifiable tolerance range for a change in the DC link direct voltage, after the first measurement of the actual value, to store the actual value in a voltage variable, after each additional measurement of the actual value, to check whether a deviation of the actual value from the value stored in the voltage variable lies within the tolerance range, and to store the actual value in the voltage variable if the deviation of the actual value from the value stored in the voltage variable lies outside of the tolerance range, and after each storage of an actual value in the voltage variable, to calculate a duty cycle, which is dependent on this actual value, of the pulse-width modulation and to control the pulse-width modulation with this duty cycle.

In one configuration of a power converter according to the invention, the control unit is set up to detect a calculation number of calculations of the duty cycle. Furthermore, the control unit can be set up to store a specifiable threshold value for the calculation number, to compare the calculation number with the threshold value and to produce a warning signal if the calculation number reaches the threshold value. Alternatively or additionally, the power converter can have a display unit which is set up to display the calculation number.

A power converter according to the invention makes it possible to carry out the method according to the invention. The advantages of a power converter of this type therefore correspond to the above mentioned advantages of the method according to the invention.

An electrical switch according to the invention comprises a switch drive with an electric motor and a power converter according to the invention for producing a motor voltage for the electric motor. In particular, the electrical switch can be a power switch or a circuit breaker.

A computer program according to the invention comprises commands which, when executing the computer program by means of a control unit, prompt it to carry out the method according to the invention.

The above described properties, features and advantages of this invention as well as the manner in which they are achieved become clearer and more clearly comprehensible in the context of the subsequent description of exemplary embodiments which are explained in greater detail in the context of the drawings.

BRIEF DESCRIPTION OF THE FIGURES

FIG. 3 shows a flow diagram of a method for producing a motor voltage.

DETAILED DESCRIPTION OF THE INVENTION

Mutually corresponding parts are provided with the same reference numbers in the figures.

Figure 1:
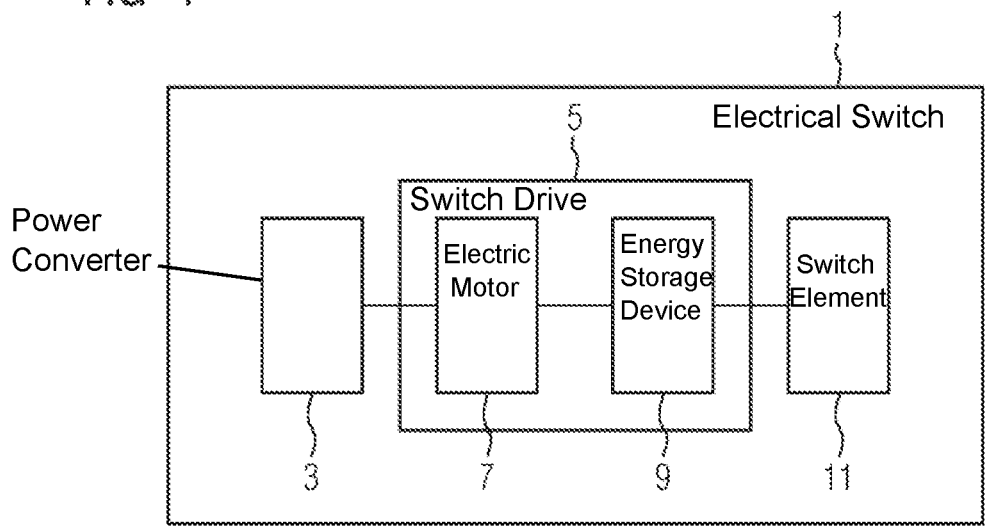
FIG. 1 shows a block diagram of an electrical switch.

FIG. 1 (FIG. 1) shows a block diagram of an exemplary embodiment of an electrical switch 1 according to the invention, for example a power switch or a circuit breaker. The switch 1 comprises a power converter 3 according to the invention, a switch drive 5 with an electric motor 7 and an energy storage device 9 and a switch element 11. The power converter 3 is set up to produce a motor voltage for the electric motor 7 from a supply voltage in the manner described in more detail below based on FIG. 3 (FIG. 3). The energy storage device 9 can be charged by the electric motor 7. The energy storage device 9 is a spring accumulator with a spring which can be tensioned by the electric motor 7, for example. The switch element 11 is movable by way of energy stored in the energy storage device 9. A current path can be interrupted and closed by moving the switch element 11. Alternative exemplary embodiments of the switch 1 make provision for the switch element 11 to be able to be driven by the electric motor 7 directly or via a gearbox, instead of an energy storage device 9, for example.

Figure 2:
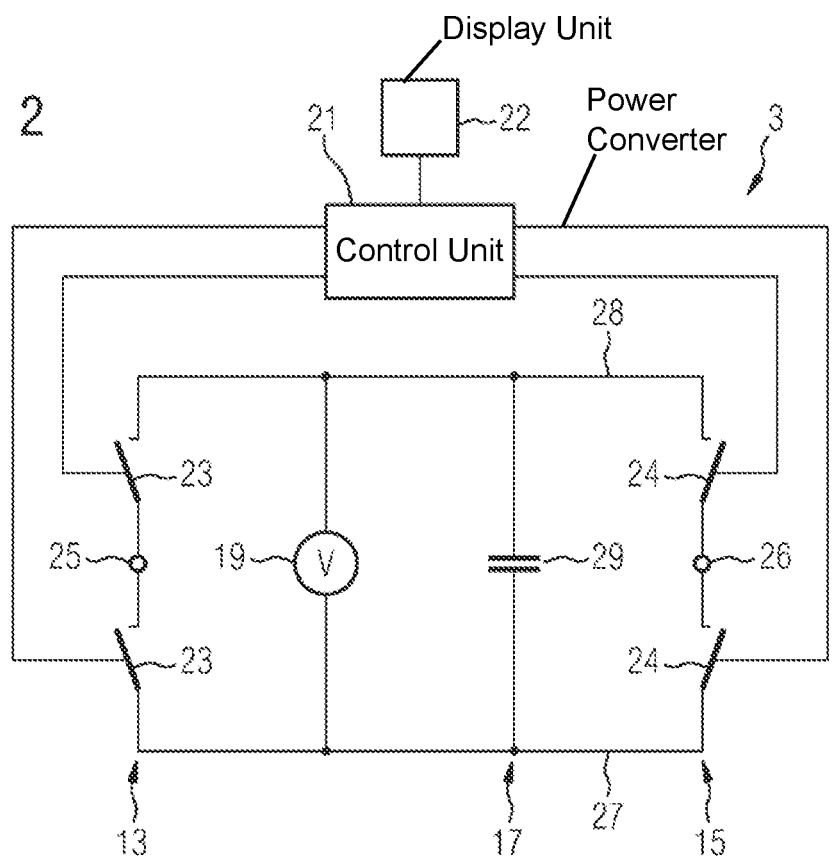
FIG. 2 shows a circuit diagram of a power converter.

FIG. 2 (FIG. 2) shows an exemplary embodiment of a power converter 3 according to the invention. The power converter 3 has two power converter units 13, 15, a DC link 17, a measuring unit 19 and a control unit 21. Each power converter unit 13, 15 has two series connected switch units 23, 24, between which a power converter connection 25, 26 is arranged in each case. The switch units 23, 24 are controllable semiconductor switches, for example, such as an IGBT or MOSFET. Alternatively, the switch units 23 of the first power converter unit 13 are diodes and the switch units 24 of the second power converter unit 15 are controllable semiconductor switches such as an IGBT or MOSFET. The DC link 17 comprises two DC link lines 27, 28, which connect the two power converter units 13, 15 to one another, and a DC link capacitor 29, the electrodes of which are connected to one of the DC link lines 27, 28 in each case. The measuring unit 19 is set up to measure a DC link direct voltage between the DC link lines 27, 28. The controllable switch units 23, 24 can be controlled by means of the control unit 21.

During operation of the power converter 3, a supply voltage is applied between the power converter connection 25 of a first power converter unit 13 and one of the DC link lines 27, 28. The DC link direct voltage is produced from the supply voltage by means of the first power converter unit 13. The supply voltage can be a single-phase alternating voltage or a direct voltage. If the supply voltage is a single-phase alternating voltage, it is rectified by the first power converter unit 13 to the DC link direct voltage. If the supply voltage is a direct voltage, it is used directly as a DC link direct voltage, for example, wherein a switch unit 23 of the first power converter unit 13 is permanently open and the other switch unit 23 of the first power converter unit 13 is permanently closed. The motor voltage for the electric motor 7 is produced by pulse-width modulation of the DC link direct voltage by means of the second power converter unit 15 in the manner described in more detail below. For this purpose, a motor winding of the electric motor 7 is connected to the power converter connection 26 of the second power converter unit 15.

The exemplary embodiment of a power converter 3 shown in FIG. 2 is set up for producing a single-phase motor voltage. Other exemplary embodiments can make provision for the power converter 3 to be able to produce a multiphase motor voltage, wherein the second power converter unit 15 has a pair of switch units 24 and a power converter connection 26 arranged therebetween for each phase of the motor voltage. Additionally or alternatively, other exemplary embodiments can make provision for the first power converter unit 13 to have a pair of switch units 23 and a power converter connection 25 arranged therebetween for each phase of a multiphase supply voltage, in order to produce the DC link direct voltage from a multiphase supply voltage.

FIG. 3 (FIG. 3) shows a flow diagram 100 of an exemplary embodiment of a method according to the invention for producing a specified motor voltage with a power converter 1 shown in FIG. 1. The method is implemented by a computer program which is executed by the control unit 21 and which evaluates actual values of the DC link direct voltage which are measured by the measuring unit 19.

In a first method step 101, a tolerance range for a change in the DC link direct voltage is specified. The tolerance range is specified symmetrically or asymmetrically around a value which is stored in a voltage variable during the method. The limits of the tolerance range are specified by absolute values or relative values of the deviation of the actual value from the value stored in the voltage variable in each case.

In a second method step 102, the power converter 3 is activated and an actual value of the DC link direct voltage is measured for the first time.

In a third method step 103, the current actual value of the DC link direct voltage is stored in the voltage variable.

In a fourth method step 104, a duty cycle, which is dependent on the value stored in the voltage variable, of the pulse-width modulation is calculated, in order to produce the motor voltage by pulse-width modulation of the DC link direct voltage.

In a fifth method step 105, the DC link direct voltage is pulse-width modulated with the duty cycle calculated in the fourth method step 104, wherein the switch units 24 of the second power converter unit 15 are correspondingly controlled by the control unit 21.

In a sixth method step 106, a current actual value of the DC link direct voltage is measured.

In a seventh method step 107, it is checked whether a deviation of the actual value measured in the sixth method step 106 from the value stored in the voltage variable lies within the tolerance range specified in the first method step 101. If this is the case, the method continues with an eighth method step 108. Otherwise, the method continues with the third method step 103.

In the eighth method step 108, it is checked whether the energy storage device 9 is fully charged. If this is the case (i.e. if the energy storage device 9 is fully charged), the method continues with a ninth method step 109. Otherwise, the method continues with the fifth method step 105.

In the ninth method step 109, the electric motor 7 is switched off and the method is concluded.

Provision can optionally be made for the calculations of the duty cycle to be counted during the method. Furthermore, provision can be made for the calculation number to be displayed and/or for a warning signal to be produced if the calculation number reaches or exceeds a specifiable threshold value. For this purpose, in the second method step 102, a count variable for the calculation number is initialized with the value zero, for example. Furthermore, provision can be made for a threshold value for the calculation number to be additionally specified in the first method step 101. In the fourth method step 104, the value stored in the count variable is then additionally incremented by one. The value currently stored in the count variable is displayed on a display unit 22 of the power converter 3, for example. If in the first method step 101 a threshold value for the calculation number has been specified, this value can further be compared with the threshold value in the fourth method step 104 after incrementing the value stored in the count variable, and an optical and/or acoustic warning signal can be emitted if the value stored in the count variable corresponds to the calculation number or exceeds the calculation number.

If the switch 1 does not have an energy storage device 9, but rather the switch element 11 can be driven by the electric motor 7 directly or via a gearbox, it is checked in the eighth method step 108 whether the switch element 11 has reached a switch position into which it is to be moved by the electric motor 7. If this is the case (i.e. if the switch element 11 has reached the switch position), the method continues with a ninth method step 109. Otherwise, the method continues with the fifth method step 105. The other method steps 101 to 107 and 109 are carried out as described previously.

Despite the fact that the invention has been illustrated and described in greater detail by preferred exemplary embodiments, the invention is not limited by the disclosed examples and other variations can be derived from this by the person skilled in the art, without departing from the scope of protection of the invention.

The invention claimed is:

1. A method for producing a motor voltage for an electric motor of a switch drive of an electrical switch, the method comprising:
   producing a DC link direct voltage from a supply voltage;
   producing the motor voltage by pulse-width modulation of the DC link direct voltage;
   specifying a tolerance range for a change in the DC link direct voltage;
   continually measuring an actual value of the DC link direct voltage;
   after a first measurement of the actual value, storing the actual value in a voltage variable;
   after each additional measurement of the actual value, checking whether a deviation of the actual value from the value stored in the voltage variable lies within the tolerance range, and storing the actual value in the voltage variable when the deviation of the actual value from the value stored in the voltage variable lies outside of the tolerance range; and
   after each storage of an actual value in the voltage variable, calculating a duty cycle, being dependent on the actual value, of the pulse-width modulation and carrying out the pulse-width modulation with the duty cycle.

2. The method according to claim 1, which further comprises specifying the tolerance range symmetrically around the value stored in the voltage variable.

3. The method according to claim 1, which further comprises specifying the tolerance range asymmetrically around the value stored in the voltage variable.

4. The method according to claim 1, which further comprises specifying limits of the tolerance range by absolute values of the deviation of the actual value from the value stored in the voltage variable.

5. The method according to claim 1, which further comprises specifying limits of the tolerance range by relative values of the deviation of the actual value from the value stored in the voltage variable.

6. The method according to claim 1, which further comprises detecting a calculation number of calculations of the duty cycle.

7. The method according to claim 6, which further comprises specifying a threshold value for the calculation number, comparing the calculation number with the threshold value and producing a warning signal when the calculation number reaches or exceeds the threshold value.

8. The method according to claim 6, which further comprises displaying the calculation number on a display unit.

9. A non-transitory computer program product with instructions stored thereon, that when executed by a control unit, perform the steps of claim 1.

10. A power converter for producing a motor voltage for an electric motor of a drive of an electrical switch, the power converter comprising:
   a first power converter unit configured to produce a DC link direct voltage from a supply voltage;
   a measuring unit configured to continually measure an actual value of the DC link direct voltage;
   a second power converter unit configured to produce the motor voltage by pulse-width modulation of the DC link direct voltage; and
   a control unit configured:
      to store a specifiable tolerance range for a change in the DC link direct voltage,
      after a first measurement of the actual value, to store the actual value in a voltage variable, after each additional measurement of the actual value, to check whether a deviation of the actual value from the value stored in the voltage variable lies within the tolerance range, and to store the actual value in the voltage variable when the deviation of the actual value from the value stored in the voltage variable lies outside of the tolerance range; and after each storage of an actual value in the voltage variable, to calculate a duty cycle, being dependent on the actual value, of the pulse-width modulation and to control the pulse-width modulation with the duty cycle.

11. The power converter according to claim 10, wherein said control unit is configured to detect a calculation number of calculations of the duty cycle.

12. The power converter according to claim 11, wherein said control unit is configured to store a specifiable threshold value for the calculation number, to compare the calculation number with the threshold value and to produce a warning signal when the calculation number reaches the threshold value.

13. The power converter according to claim 10, which further comprises a display unit configured to display the calculation number.

14. An electrical switch, comprising:
a switch drive having an electric motor; and
the power converter according to claim 10 for producing the motor voltage for the electric motor.

15. The electrical switch according to claim 14, wherein the electrical switch is a power switch or a circuit breaker.

* * * * *